(12) United States Patent
Costanzo et al.

(10) Patent No.: US 10,305,948 B2
(45) Date of Patent: *May 28, 2019

(54) AUDIO-VIDEO DATA SWITCHING AND VIEWING SYSTEM

(71) Applicants: Flippo Costanzo, Los Angeles, CA (US); Saverio Roncolini, Rome (IT); Antonio Rossi, Rome (IT)

(72) Inventors: Flippo Costanzo, Los Angeles, CA (US); Saverio Roncolini, Rome (IT); Antonio Rossi, Rome (IT)

(*) Notice: Subject to any disclaimer, the term of this patent is extended or adjusted under 35 U.S.C. 154(b) by 372 days.

This patent is subject to a terminal disclaimer.

(21) Appl. No.: 14/993,334

(22) Filed: Jan. 12, 2016

(65) Prior Publication Data

US 2016/0241616 A1 Aug. 18, 2016

Related U.S. Application Data

(63) Continuation of application No. 13/403,841, filed on Feb. 23, 2012, now Pat. No. 9,264,472, which is a (Continued)

(51) Int. Cl.
*G06F 15/16* (2006.01)
*H04L 29/06* (2006.01)
(Continued)

(52) U.S. Cl.
CPC .... *H04L 65/4076* (2013.01); *H04L 29/06027* (2013.01); *H04L 65/4084* (2013.01);
(Continued)

(58) Field of Classification Search
CPC .................................................. H04L 65/4076
See application file for complete search history.

(56) References Cited

U.S. PATENT DOCUMENTS

| 5,331,417 A | 7/1994 | Soohoo ......................... 348/584 |
| 5,557,724 A * | 9/1996 | Sampat ............... H04L 12/1859 |
| | | 348/E5.105 |

(Continued)

OTHER PUBLICATIONS

Civil Case 13-cv-1455 Northern District of Illinois, Big Ten Network LLC's Non-Infringement, Unenforceability and Invalidity Contentions—Exhibit C, Forecast et al. U.S. Pat. No. 6,230,200.
(Continued)

*Primary Examiner* — Douglas B Blair
(74) *Attorney, Agent, or Firm* — Clifford H. Kraft

(57) ABSTRACT

A computer system and method providing for viewing and switching of audio-video data. The system comprises: a plurality of audio/video sources containing information referring to an event; a streaming server, streaming the contents of a first audio signal and a first video signal from the audio and video sources to a user; a feed distributor controllably feeding the first audio signal and first video signal to the streaming server; and a user-operated control unit communicating with the feed distributor and controlling operation of the feed distributor, so as to instruct the feed distributor to switch between audio or video. Switching between audio signals occurs without altering the video signals and switching between video signals occurs without altering the audio signals.

5 Claims, 3 Drawing Sheets

Related U.S. Application Data continuation of application No. 12/497,273, filed on Jul. 2, 2009, now Pat. No. 8,156,236, which is a continuation of application No. 09/897,708, filed on Jul. 2, 2001, now Pat. No. 7,571,244.

(60) Provisional application No. 60/218,507, filed on Jul. 15, 2000.

(51) Int. Cl.

| | | |
|---|---|---|
| *H04N 7/173* | (2011.01) | |
| *H04N 21/218* | (2011.01) | |
| *H04N 21/234* | (2011.01) | |
| *H04N 21/2368* | (2011.01) | |
| *H04N 21/431* | (2011.01) | |
| *H04N 21/434* | (2011.01) | |
| *H04N 21/44* | (2011.01) | |
| *H04N 21/462* | (2011.01) | |
| *H04N 21/4782* | (2011.01) | |
| *H04N 21/61* | (2011.01) | |
| *H04N 21/6547* | (2011.01) | |
| *H04N 21/6587* | (2011.01) | |
| *H04N 21/2385* | (2011.01) | |
| *H04L 29/08* | (2006.01) | |

(52) U.S. Cl.
CPC ..... *H04L 65/4092* (2013.01); *H04N 7/17318* (2013.01); *H04N 21/21805* (2013.01); *H04N 21/2368* (2013.01); *H04N 21/2385* (2013.01); *H04N 21/23424* (2013.01); *H04N 21/4312* (2013.01); *H04N 21/4314* (2013.01); *H04N 21/4341* (2013.01); *H04N 21/44016* (2013.01); *H04N 21/4622* (2013.01); *H04N 21/4782* (2013.01); *H04N 21/6125* (2013.01); *H04N 21/6547* (2013.01); *H04N 21/6587* (2013.01); *H04L 67/2847* (2013.01)

(56) References Cited

U.S. PATENT DOCUMENTS

| | | | | |
|---|---|---|---|---|
| 5,729,471 A * | 3/1998 | Jain | ...................... | H04N 13/139 725/131 |
| 5,828,370 A | 10/1998 | Moeller et al. | | |
| 5,861,881 A * | 1/1999 | Freeman | ........... | G06F 17/30044 348/E5.096 |
| 5,913,062 A * | 6/1999 | Vrvilo | .................... | G06Q 10/10 348/E7.082 |
| 5,953,506 A * | 9/1999 | Kalra | .................... | G06T 3/4092 345/428 |
| 6,128,649 A | 10/2000 | Smith et al. | ................... | 709/217 |
| 6,144,375 A | 11/2000 | Jain et al. | ...................... | 715/251 |
| 6,161,137 A | 12/2000 | Ogden et al. | | |
| 6,230,200 B1 | 5/2001 | Forecast et al. | | |
| 6,279,029 B1 * | 8/2001 | Sampat | ............... | H04L 12/1859 709/203 |
| 6,314,569 B1 | 11/2001 | Chernock et al. | .............. | 725/37 |
| 6,343,313 B1 | 1/2002 | Salesky | | |
| 6,389,473 B1 | 5/2002 | Carmel et al. | | |
| 6,480,541 B1 | 11/2002 | Girod et al. | | |
| 6,510,553 B1 * | 1/2003 | Hazra | ...................... | H04N 5/45 348/563 |
| 6,611,628 B1 | 8/2003 | Sekiguchi et al. | ............ | 382/243 |
| 6,622,171 B2 | 9/2003 | Gupta et al. | .................. | 709/231 |
| 6,636,238 B1 * | 10/2003 | Amir | .................. | G06F 17/3074 707/E17.101 |
| 6,806,909 B1 | 10/2004 | Radha et al. | .............. | 348/384.1 |
| 6,823,010 B1 | 11/2004 | Curet et al. | | |
| 6,871,006 B1 | 3/2005 | Oguz et al. | .................. | 386/346 |
| 6,909,726 B1 | 6/2005 | Sheeran | ........... | 370/468 |
| 6,937,770 B1 | 8/2005 | Oguz et al. | ................... | 382/235 |
| 6,961,954 B1 * | 11/2005 | Maybury | .......... | G06F 17/30787 707/999.003 |
| 7,079,176 B1 * | 7/2006 | Freeman | ................... | G03C 1/26 348/207.1 |
| 7,196,722 B2 | 3/2007 | White et al. | | |
| 7,237,254 B1 | 6/2007 | Omoigui | ........................ | 725/94 |
| 7,245,664 B1 | 7/2007 | Ohnami | .................... | 375/240.28 |
| 7,571,244 B2 * | 8/2009 | Costanzo | .......... | H04L 29/06027 709/219 |
| 7,823,066 B1 * | 10/2010 | Kuramura | .............. | G06Q 30/00 715/717 |
| 8,156,236 B2 * | 4/2012 | Costanzo | .......... | H04L 29/06027 709/231 |
| 8,341,662 B1 | 12/2012 | Bassett et al. | | |
| 9,264,472 B2 * | 2/2016 | Costanzo | .......... | H04L 29/06027 |
| 2001/0049826 A1 * | 12/2001 | Wilf | ........................ | H04N 5/50 725/120 |
| 2002/0101442 A1 | 8/2002 | Costanzo et al. | ............. | 345/723 |
| 2002/0126668 A1 | 9/2002 | Horowitz et al. | ............. | 370/389 |
| 2002/0136298 A1 | 9/2002 | Anantharamu et al. | ..................... | 375/240.12 |
| 2002/0170067 A1 * | 11/2002 | Norstrom | ......... | H04N 21/23424 725/109 |
| 2002/0188943 A1 * | 12/2002 | Freeman | .................. | G03C 1/26 725/38 |
| 2003/0002854 A1 | 1/2003 | Belknap et al. | ................ | 386/68 |
| 2004/0261127 A1 * | 12/2004 | Freeman | .................. | G03C 1/26 725/135 |
| 2007/0053428 A1 | 3/2007 | Saleem et al. | ................ | 375/240 |
| 2007/0107029 A1 | 5/2007 | Monroe et al. | ............... | 725/105 |
| 2012/0151562 A1 | 6/2012 | Ortiz et al. | ....................... | 726/4 |
| 2014/0104430 A1 | 4/2014 | Frederick | ..................... | 348/157 |

OTHER PUBLICATIONS

Civil Case 13-cv-1455 Northern District of Illinois, Big Ten Network LLC's Non-Infringement, Unenforceability and Invalidity Contentions—Exhibit D, Girod et al U.S. Pat. No. 6,480,541.
Civil Case 13-cv-1455 Northern District of Illinois, Big Ten Network LLC's Non-Infringement, Unenforceability and Invalidity Contentions—Exhibit E, Gupta et al. U.S. Pat. No. 6,622,171.
Civil Case 13-cv-1455 Northern District of Illinois, Big Ten Network LLC's Non-Infringement, Unenforceability and Invalidity Contentions—Exhibit F, Moeller et al. U.S. Pat. No. 5,828,370.
Civil Case 13-cv-1455 Northern District of Illinois, Big Ten Network LLC's Non-Infringement, Unenforceability and Invalidity Contentions—Exhibit G, Ogden et al. U.S. Pat. No. 6,161,137.
Civil Case 13-cv-1455 Northern District of Illinois, Big Ten Network LLC's Non-Infringement, Unenforceability and Invalidity Contentions—Exhibit H, Omoigui U.S. Pat. No. 7,237,254.
Civil Case 13-cv-1455 Northern District of Illinois, Big Ten Network LLC's Non-Infringement, Unenforceability and Invalidity Contentions—Exhibit I, Radha et al. U.S. Pat. No. 6,806,909.
Civil Case 13-cv-1455 Northern District of Illinois, Big Ten Network LLC's Non-Infringement, Unenforceability and Invalidity Contentions—Exhibit J, Salesky U.S. Pat. No. 6,343,313.
Civil Case 13-cv-1455 Northern District of Illinois, Big Ten Network LLC's Non-Infringement, Unenforceability and Invalidity Contentions—Exhibit K—Broadcast .com.
Civil Case 13-cv-1455 Northern District of Illinois, Big Ten Network LLC's Non-Infringement, Unenforceability and Invalidity Contentions—Exhibit L—CU-SeeMe Conferencing System.
Civil Case 13-cv-1455 Northern District of Illinois, Big Ten Network LLC's Non-Infringement, Unenforceability and Invalidity Contentions—RealNetworks, Inc, RealSystem G2.
Real Time Streaming Protocol (RTSP) RFC 2326, Apr. 1998. EX 1024.
MPEG2, John Watkinson, 1999 Focal Press, pp. 13-17, 183-187, 214-221. EX 1025.
Petition for Inter-Partes Review of U.S. Pat. No. 8,156,236, filed Mar. 20, 2014.
RealSystem G2 Production Guide, 1998-2000. Document produced in Request for Inter-Partes Review. Applicant does not admit this is prior art. EX1002.

(56) References Cited

OTHER PUBLICATIONS

RealProducer Plus User's Guide, 1998-1999. Document produced in Request for Inter-Partes Review. Applicant does not admit this is prior art. EX1003.
RealNetworks. http://service.real.com/helplibraryblueprints/85codecs/htmlfiles/producer2.html, Copyright 2001. Document produced in Request for Inter-Partes Review. Applicant does not admit this is prior art. EX1004.
RealServer Administration Guide—copyright 1998-99. Document produced in Request for Inter-Partes Review. Applicant does not admit this is prior art. EX1005.
RealSystem G2: Management and Control of Streaming Media over Corporate Networks. Copyright 1999. Document produced in Request for Inter-Partes Review. Applicant does not admit this is prior art. EX1006.
RealMedia File Format Memo, Internet Draft, Mar. 13, 1998. Document produced in Request for Inter-Partes Review. Applicant does not admit this is prior art. EX1007.
Working with RealProducer 8 Codec, May 19, 2000. Document produced in Request for Inter-Partes Review. Applicant does not admit this is prior art. EX1008.
RealProxy G2 Administration Guide, Beta One, Copyright 1999. Document produced in Request for Inter-Partes Review. Applicant does not admit this is prior art. EX1009.
RealPlayer Plus G2 "Chapter 8", Troubleshooting, Copyright 1998-99. Document produced in Request for Inter-Partes Review. Applicant does not admit this is prior art. EX1010.
RealServer Administration and Content Creation Guide, version 4.0, Copyright 1995-97. Document produced in Request for Inter-Partes Review. Applicant does not admit this is prior art. EX1011.
RealPlayer 8 Beta Released, May 25, 2000. Document produced in Request for Inter-Partes Review. Applicant does not admit this is prior art. EX1012.
Delivering RealAudio or RealVideo from a Web Server, RealNetworks Technical Bluepring Series, Copyright 1998. Document produced in Request for Inter-Partes Review. Applicant does not admit this is prior art. EX1013.
RealSystem Production Guide, Release 8, Copyright 1998-2000. Document produced in Request for Inter-Partes Review. Applicant does not admit this is prior art. EX1014.
RealPlayer Plus, RealPlayer 8 Plus User Manual, Copyright 2000 Document produced in Request for Inter-Partes Review. Applicant does not admit this is prior art. EX1015.
Embedded RealPlayer Extended Functionality, Dec. 21, 1998. Document produced in Request for Inter-Partes Review. Applicant does not admit this is prior art. EX1016.
RealProducer Plus Help: Chapter 2: Streaming Media Basics, Copyright 1998-99. Document produced in Request for Inter-Partes Review. Applicant does not admit this is prior art. EX1017.
RealProducer Plus User's Guide, Version G2, Copyright 1998. Document produced in Request for Inter-Partes Review. Applicant does not admit this is prior art. EX1018.
RealProducer Pro User's Guide, Version G2, Copyright 1998-99. Document produced in Request for Inter-Partes Review. Applicant does not admit this is prior art. EX1019.
RealSystem G2 Syntax Style Guide, Copyright 1998. Document produced in Request for Inter-Partes Review. Applicant does not admit this is prior art. EX1020.
Hypertext Transfer Protocol—HTTP/1.1 RFC2616, Jun. 1999. EX1023.
Civil Case 13-cv-1455 Northern District of Illinois, Big Ten Network LLC's Non-Infringement, Unenforceability and Invalidity Contentions.
Civil Case 13-cv-1455 Northern District of Illinois, Big Ten Network LLC's Non-Infringement, Unenforceability and Invalidity Contentions—Exhibit A, Supplementary Chart on Non-Infringement.
Civil Case 13-cv-1455 Northern District of Illinois, Big Ten Network LLC's Non-Infringement, Unenforceability and Invalidity Contentions—Exhibit B Bassett U.S. Pat. No. 8,341,622.
Complaint of Cascades Streaming Technologies, LLC with reference to U.S Pat. No. 8,156,236.
Exhibit B to Complaint of Cascades Streaming Technologies, LLC with reference to U.S. Pat. No. 8,156,236.
Answer, Affirmative Defense and Counterclaim of Big Ten Network, LLC with reference to U.S. Pat. No. 8,156,236.
Initial Non-Infringement, Unenforceability, and Invalidity Contentions of Big Ten Network, LLC with reference to U.S. Pat. No. 8,156,236 dated Jul. 15, 2013.
Response to Initial Non-Infringement Unenforceability, and Invalidity Contentions of Cascades Streaming Technologies, LLC dated Aug. 2, 2013.
Exhibit B to Response to Initial Non-Infringement Unenforceability, and Invalidity Contentions of Cascades Streaming Technologies, LLC dated Aug. 2, 2013.
Exhibit C to Response to Initial Non-Infringement Unenforceability, and Invalidity Contentions of Cascades Streaming Technologies, LLC dated Aug. 2, 2013.
Exhibit D to Response to Initial Non-Infringement Unenforceability,and Invalidity Contentions of Cascades Streaming Technologies, LLC dated Aug. 2, 2013.
Exhibit E to Response to Initial Non-Infringement Unenforceability, and Invalidity Contentions of Cascades Streaming Technologies, LLC dated Aug. 2, 2013.
Exhibit F to Response to Initial Non-Infringement Unenforceability, and Invalidity Contentions of Cascades Streaming Technologies, LLC dated Aug. 2, 2013.
Exhibit G to Response to Initial Non-Infringement Unenforceability, and Invalidity Contentions of Cascades Streaming Technologies, LLC dated Aug. 2, 2013.
Exhibit H to Response to Initial Non-Infringement Unenforceability, and Invalidity Contentions of Cascades Streaming Technologies, LLC dated Aug. 2, 2013.
Exhibit I to Response to Initial Non-Infringement Unenforceability, and Invalidity Contentions of Cascades Streaming Technologies, LLC dated Aug. 2, 2013.
Exhibit J to Response to Initial Non-Infringement Unenforceability, and Invalidity Contentions of Cascades Streaming Technologies, LLC dated Aug. 2, 2013.
Exhibit K to Response to Initial Non-Infringement Unenforceability, and Invalidity Contentions of Cascades Streaming Technologies, LLC dated Aug. 2, 2013.
Exhibit L to Response to Initial Non-Infringement Unenforceability, and Invalidity Contentions of Cascades Streaming Technologies, LLC dated Aug. 2, 2013.
Exhibit M to Response to Initial Non-Infringement Unenforceability, and Invalidity Contentions of Cascades Streaming Technologies, LLC dated Aug. 2, 2013.
Archived image of from iMove,<http://www.imoveinc.com>, from Aug. 9, 2013.
Archived image of from Endemol,<http://www.endemol.com>, from Aug. 9, 2013.
Archived image of from CBS,<http://www.cbs.com/primetime/bigbrother>, from Aug. 9, 2013.
PTAB Decision, case # IPR2014-00526, U.S. Pat. No. 8,156,236, Costanzo, Decision denying Inter-Partes Review, Sep. 3, 2014.
Memorandum Opinion and Order, United States, United States District Court for the Northern District of Illinois, Eastern Division, Dec. 15, 2017 (Ordering Summary Judgment).
Big Ten Network, LLC's Final LPR 3.1 Invalidity Contentions, United States District Court for the Northern District of Illinois Eastern Division, Civil Action No. 13-CV-1455, in the form of Exhibit A, Oct. 18, 2016.
Big Ten Network, LLC's Supplemental Invalidity Contentions, United States District Court for the Northern District of Illinois Eastern Division, Civil Action No. 13-CV-1455, in the form of Exhibit A, May 2, 2017.
Big Ten Network, LLC's Final LPR 3.1 Invalidity Contentions, United States District Court for the Northern District of Illinois Eastern Division, Civil Action No. 13-CV-1455, Exhibits B-P, Oct. 18, 2016.

(56) References Cited

OTHER PUBLICATIONS

Memorandum Opinion and Order (Claim Construction), United States District Court for the Northern District of Illinois Eastern Division, Civil Action No. 13-CV-1455, May 4, 2016.
Memorandum Opinion and Order (Reconsideration Opinion—claim construction), United States District Court for the Northern District of Illinois Eastern Division, Civil Action No. 13-CV-1455, Jul. 16, 2016.
Brief of Plaintiff—*Appellant, Cascades Streaming Technologies, LLC* v. *Big Ten Network, LLC*, Appeal No. 2018-1424,—Appellant Brief to CAFC in case of related U.S. Pat. No. 8,156,236, Mar. 19, 2018.
Corrected Brief on Behalf of Defendant—*Appellee, Cascades Streaming Technologies, LLC* v. *Big Ten Network, LLC*, Appeal No. 2018-1424,—Appellee Brief to CAFC in case of related U.S. Pat. No. 8,156,23, May 11, 2018.
Reply Brief of Plaintiff—*Appellant, Cascades Streaming Technologies, LLC* v. *Big Ten Network, LLC*, Appeal No. 2018-1424, Appellant Reply Brief to CAFC in case of related U.S. Pat. No. 8,156,23, Jun. 20, 2018.
United States Court of Appeals for the Federal Circuit Final Judgment in civil case 1:13-cv-01455, CAFC Case No. 18-1424. Judgment of Lower Court affirmed.

\* cited by examiner

AUDIO-VIDEO DATA SWITCHING AND VIEWING SYSTEM

CROSS-REFERENCE TO RELATED APPLICATION

The present application is a continuation of U.S. patent application Ser. No. 13/403,841 filed Feb. 23, 2012 which was a continuation of application Ser. No. 12/497,273 filed Jul. 2, 2009, now U.S. Pat. No. 8,156,236, which was a continuation of U.S. patent application Ser. No. 09/897,708 filed Jul. 2, 2001, now U.S. Pat. No. 7,571,244, which claims the benefit of U.S. provisional patent application 60/218,507, filed Jul. 15, 2000. Application Ser. Nos. 13/403,841, 12/497,273, 09/897,708 and 60/218,507 are hereby incorporated by reference in their entireties.

FIELD OF THE INVENTION

The present invention relates to webcast streaming of audio-visual events. More specifically, the invention relates to an audio-video data switching and viewing system which allows viewing and smooth remote switching from one video signal to another or from one audio signal to another.

BACKGROUND OF THE INVENTION

According to the webcast streaming technology, a client-server connection is established, where the server transmits multiple streams or files to each client. Each stream or file relates to a different point of view. Each stream or file is output either from stored files or from live encoded feeds, for example by means of encoding stations.

FIG. 1 shows an exemplary embodiment of such prior art system. Products embodying such technology are, for example, produced by the company iMove Inc., and shown at the website address http://www.imoveinc.com. A streaming server 1 located on the server side receives audio-visual information from a number of different audio-visual files or streams connected to the source of information, such as an audio file FA and video files FV1 . . . FVn, all indicated with 2 in the Figure.

The audio-visual content of the number n of files 2 (three in the example) is streamed from the server to the client over a connection 3. The connection 3 is an Internet connection. As a consequence, it can assemble different network technologies, such as Ethernet, Frame Relay, ATM switch, CDN, satellite uplink and downlink, DS1, D2, DS3 (or the corresponding European E1, E2, E3), fiber, modem, ISDN, xDSL, and so on. All these technologies use the IP protocol and are interconnected by routers, bridges and gateways. Assuming that the maximum available bandwidth for the connection is b, the maximum bandwidth for each streamed file will be b/3.

On the client side, a streaming client 4 software provides for the interpretation of the received streams. One of the streams is shown on the screen of the client in a current view. For example, the contents relating to the video file FV2 can be shown, as indicated by the box 5, represented in solid lines and relating to the "current view (2)", namely the view relating to the contents of FV2.

As soon as the viewer wants to switch on a different point of view, he will send a command to the GUI (graphic user interface) 6, for example by means of a pointing device (not shown in the Figure), and from the GUI 6 to the streaming client 4. As a result, the audio-visual content shown on the screen will from now on relate for example to the contents of FV1, indicated by the streaming server 7 box, represented in dotted lines.

A problem of the prior art shown in FIG. 1 is that the required bandwidth is directly proportional to the number of cameras (different points of view) adopted. Therefore, a high bandwidth is required in order to obtain an audio-visual content of a good quality.

In order to solve such problem, a different session for each view could be established. This means that only a single audio-visual content at the time would be streamed and, each time a client desires to switch from one view to another, the streaming server 1 would pick a different file and retransmit it to the client. Such technology is, for example, adopted in the "BigBrother" series, when transmitted over the Internet. See, for example, http://www.endemol.com or http://www-.cbs.com/primetime/bigbrother. While this solution allows a larger bandwidth, the switching delay is unacceptable for the user. In fact, according to the usual way of streaming signals, a first step of the streaming process is that of buffering data on the client computer. Then, after a predetermined amount of time, the data are shown on the screen of the client while, at the same time, the remaining data are being transferred over the connection. This means that, each time a switching occurs, a considerable amount of time would be spent in buffering again the audio-visual data of the following stream, with a delay which would be unacceptable for most kind of commercial applications and which would result in an interruption of both the audio and the visual content of the signal transmitted on the screen.

SUMMARY OF THE INVENTION

The present invention solves the prior art problems cited above, by allowing each user to remote controlling between different cameras, thus creating a customized show with a seamless switching and optimal use of bandwidth. More specifically, when switching among different points of view, the system according to the present invention is such that neither audio nor video interruptions occur, and the new view replaces the old one with a perfect transition.

According to a first aspect, the present invention provides a computer system for viewing and switching of audio-video data, comprising: a plurality of audio and video sources containing information referring to an event; a streaming server, streaming the contents of a first audio signal and a first video signal from the audio and video sources to a user; a feed distributor, connected between the audio and video sources and the streaming server, the feed distributor controllably feeding the first audio signal and first video signal to the streaming server; and a user-operated control unit communicating with the feed distributor and controlling operation of the feed distributor, so as to instruct the feed distributor to switch between video signals whereby, upon switching, the feed distributor feeds to the streaming server a second video signal which is different from the first video signal without altering the first audio signal.

According to a second aspect, the present invention provides a computer system for viewing and switching of audio-video data, comprising: a plurality of audio and video sources containing information referring to an event; a streaming server, streaming the contents of a first audio signal and a first video signal from the audio and video sources to a user; a feed distributor, connected between the audio and video sources and the streaming server, the feed distributor controllably feeding the first audio signal and first video signal to the streaming server; and a user-operated control unit communicating with the feed distributor and controlling operation of the feed distributor, so as to instruct the feed distributor to switch between audio signals whereby, upon switching, the feed distributor feeds to the streaming server a second audio signal which is different from the first audio signal without altering the first video signal.

According to a third aspect, the present invention provides a computer-operated method for viewing and switching of audio-video data, comprising the steps of: providing a plurality of audio and video sources containing information referring to an event; streaming contents of a first audio signal and a first video signal from the audio and video sources to a user; controlling the streaming of video signals, so as to switch between video signals, streaming, upon switching, a second video signal which is different from the first video signal without altering the first audio signal.

According to a fourth aspect, the present invention provides a computer-operated method for viewing and switching of audio-video data, comprising the steps of: providing a plurality of audio and video sources containing information referring to an event; streaming contents of a first audio signal and a first video signal from the audio and video sources to a user; controlling the streaming of audio signals, so as to switch between audio signals, streaming, upon switching, a second audio signal which is different from the first audio signal without altering the first video signal.

Advantageous Embodiments of the Present Invention are Claimed in the Attached Dependent Claims.

The present invention overcomes the problems of the prior art in several aspects: first, the bandwidth is not wasted as done with prior art systems. The Internet connection carries, at every time, only one video stream and one audio stream. As a consequence, a virtually unlimited number of different points of view can be used. Second, the audio signal is not interrupted during switching. Third, there is a smooth video transition on the screen of the user between different points of view.

In accordance with the present invention, there is no need to establish a new session over a new connection each time a switching of point of view occurs.

The present invention is particularly advantageous in a system requiring a high number of cameras, like for example from 30 to 50 cameras. Such high number of cameras shooting an event provides the user with a sort of a virtually infinite camera, the cameras being arranged with the correct parallax in a matrix fashion. In this case, a system like the system described in FIG. 1 cannot be implemented. By contrast, this case is well suited to the system according to the present invention, where the occupied bandwidth is independent from the number of different cameras.

Other features and advantages of the invention will become apparent to one skilled in the art upon examination of the following drawings and detailed description. It is intended that all such additional features and advantages be included herein within the scope of the invention, as is defined by the claims.

BRIEF DESCRIPTION OF THE DRAWINGS

The present invention will be understood in better detail with reference to the attached drawings, where.

DETAILED DESCRIPTION

Figure 2:
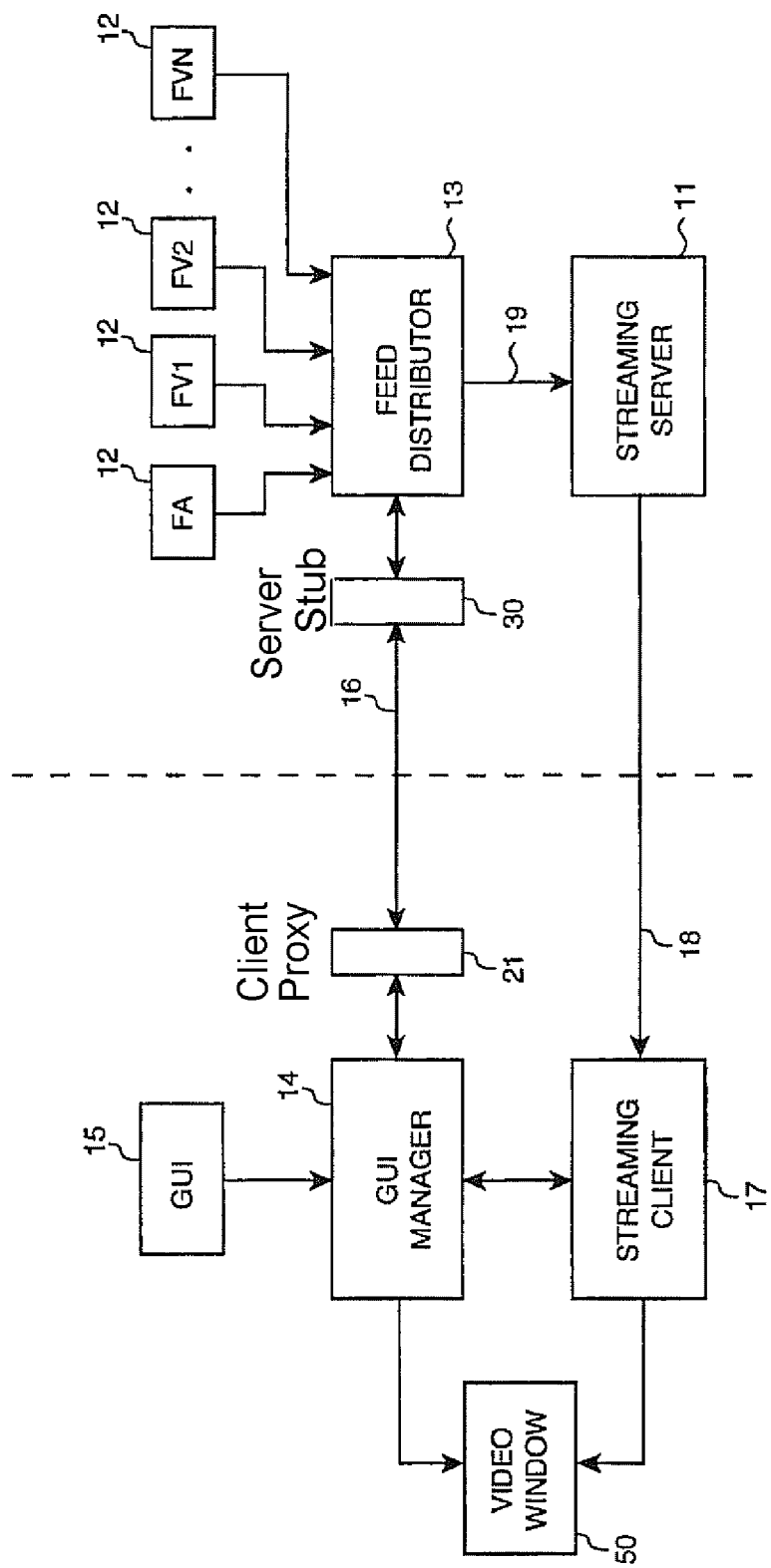
FIG. 2 is a schematic diagram of the system according to the present invention.

FIG. 2 shows a schematic diagram of the system according to the present invention. According to the present invention, a streaming server 11 on the server side is not directly connected to the audio-visual sources 12. In particular, a feed distributor 13 is present, connected between the audio-visual files 12 and the streaming server 11. The feed distributor 13 receives instructions from the GUI manager 14 located on the client side. The GUI manager 14 receives inputs from an active GUI 15, also located on the client side. The GUI manager 14 on the client side is distinct from the streaming client 17 software for processing the audio-video data streamed from the server. The streamed contents are shown on the client screen inside a video window 50. The GUI manager 14 is a user-operated control unit. The instructions from the GUI manager 14 to the feed distributor 13 are transmitted along a connection 16. A client proxy 21 and a server stub 30 are also shown, located between the GUI manager 14 and the feed distributor 13, and will be later described in better detail.

As also explained later, the feed distributor 13 could be implemented either on a computer which is separate from the computer containing the streaming server, or on the computer containing the streaming server. In the preferred embodiment of the present application, the streaming server and the feed distributor are on the same computer.

A first embodiment of the present invention provides transmitting only a single stream of audio-visual data (coming for example from the video file FV1 and also comprising the audio file FA) along a connection 18 between the streaming server 11 and the streaming client 17. A second embodiment could provide a main stream of audio-visual data output on a main window of the user, and a plurality of accessory streams output on secondary windows (thumbnails), wherein the accessory streams have an extremely reduced bandwidth occupation and wherein the audio-visual contents of the main window can be switched by the user according to the present invention.

During operation, as soon as the user wishes to change from a first point of view to a second point of view, switching for example from the video file FV1 to the video file FV2, the active GUI 15 instructs the GUI manager 14, which in turn instructs the feed distributor 13 on the server side to switch between video files. Upon receipt of such instructions, the feed distributor 13 selects the video file VF2 and transmits this file to the streaming server 11. During the switching of points of view, the audio file—which is usually interleaved with the video file during the streaming operation—is not altered. Thus, no audio switching occurs when changing view from one camera to another. Moreover, according to a preferred embodiment of the present invention, the video switching between points of view occurs in a smooth manner. Differently from what disclosed in the prior art of FIG. 1, here, a switching command by the user causes a switch on the server side, so that the streaming server 11 streams a signal which is different from the signal which was streamed before the switching command. Further, differently from what disclosed in the prior art like the Internet transmission of the BigBrother™ format, switching occurs on the video signal without need for the audio signal to be affected. Still further, as it will be clear from the following detailed description, switching can also occur on the audio signal without need for the video signal to be affected.

In the present specification, the output of the audio and video sources 12 will be usually called "audio file" and "video file". However, also a live encoded feed output is possible. The person skilled in the art will recognize that the particular kind of output from the sources 12 is not essential to the present invention, so that sometimes also the generic term "audio signal" and "video signal" will be used.

Figure 3:
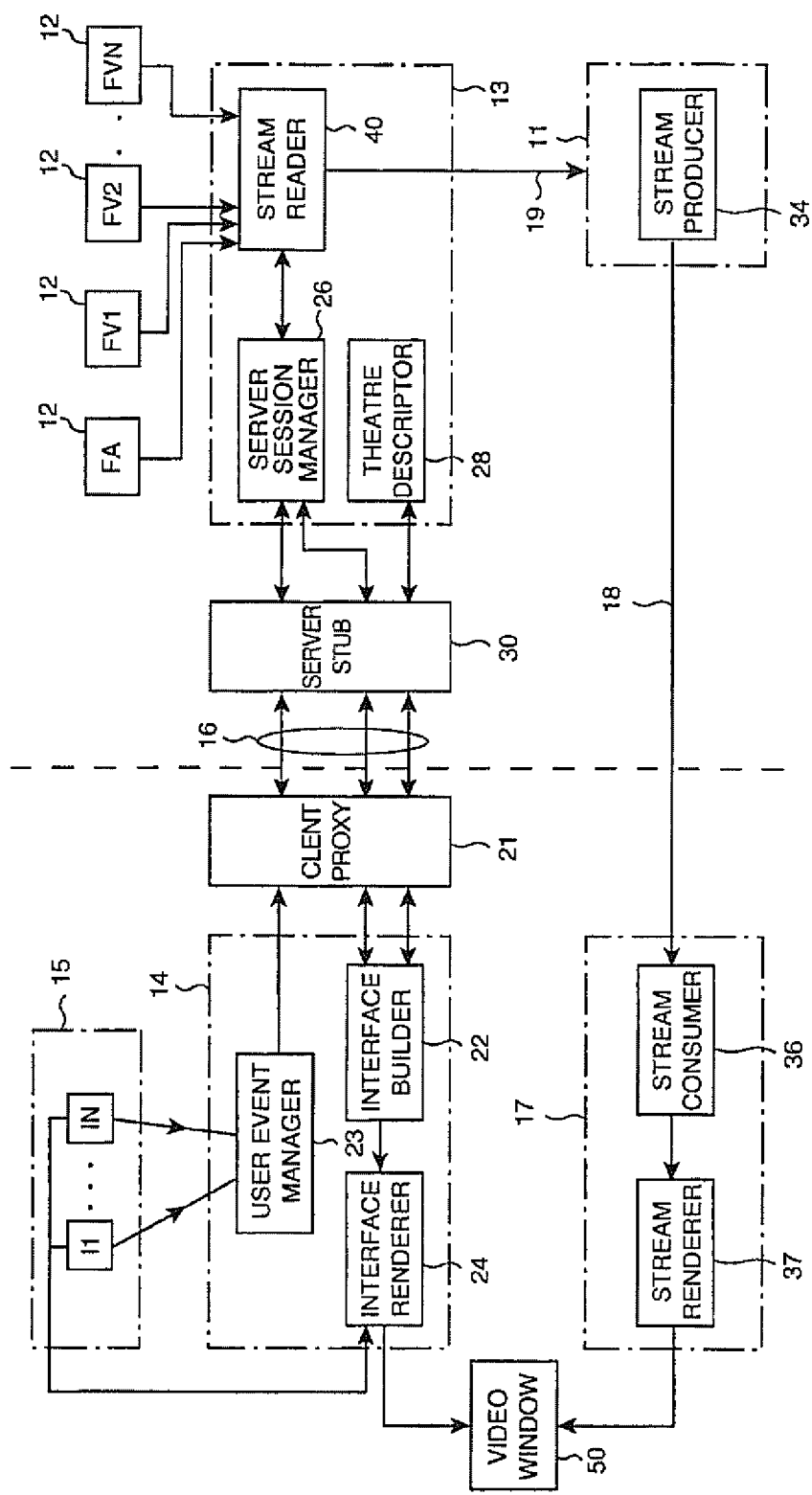
FIG. 3 describes in greater detail the diagram shown in FIG. 2.

The present invention will now be disclosed with reference to FIG. 3, which describes in greater detail the diagram shown in FIG. 2. First, the general operation of the system according to the present invention will be described with reference to three main events: 1) Request of event parameters; 2) Streaming; and 3) Switching. Subsequently, the software procedures adopted by the system according to the present invention will be described in a more detailed manner.

Request of Event Parameters

The GUI manager 14 comprises a software procedure 22 called interface builder. A first task of the interface builder 22 is that of building a graphical representation of the event parameters, by requesting such parameters to the server. The request of parameters to the server is effected through a remote procedure call (RPC), using a client proxy 21. A client proxy, known as such, is a software object encapsulating remote procedure calls. The client proxy 21 communicates with a server stub 30, located on the server side. A server stub is known as such and its function is substantially specular to that of a client proxy. The event parameters requested by the interface builder 22 are accessed by the theatre descriptor 28. The theatre descriptor 28 is a software object activated by the request of the interface builder 22, which operates by reading event information from a database on the server (not shown in the figures) and returning the event parameters to the client.

Streaming

As soon as the event parameters are returned to the client, the interface builder 22 requests the server to start streaming, the initial point of view being a predefined point of view of the event. In this respect, the interface builder 22 activates a further software procedure on the server side, called session manager 26. The session manager 26 first reads the audio and video files to be streamed, by creating a stream reading procedure called stream reader 40. The stream reader 40 receives the outputs of the audio-video files 12 and preloads audio and video samples from each point of view in corresponding vectors. Once the audio and video samples are ready to be streamed to the client, the session manager 26 generates a stream producer 34. The stream producer 34 is a software procedure responsible for performing a streaming session on the server side. More specifically, the stream producer 34 has the task of establishing a persistent connection with the client, sending stream global parameters to the client, and then sending the audio and video samples to the client.

On the client side, the interface builder 22 creates a stream consumer 36 and a stream renderer 37. The stream consumer 36 will receive samples from the stream producer 34, while the stream renderer 37 will render both the audio and the video streams. The GUI manager 14 also comprises an interface renderer 24, for rendering the user interface. More specifically, the interface renderer 24 provides an abstraction layer which takes care of details such as the operating system, the windowing interface, and the container application, like for example a Web browser. Should this be the case, the user could receive multimedia and interactive information inside the browser window at the same time as he is receiving the streaming data. The interface renderer 24 receives instructions to render the specific user interface by means of a local method call.

Switching

As a consequence of what described above, the user can enjoy the event on the video window 50. The user can now switch from the current point of view to a different point of view by interacting, for example with the click of a mouse button, with active icons representing alternative points of view. These icons are shown as elements IN . . . In the GUI 15 of FIG. 3. As soon as the user sends a switching request, a method of the user event manager 23 is activated. The user event manager 23 is a software object which is operating system dependent. The switching request is sent from the user event manager 23 to the server session manager 26, and from the server session manager 26 to the stream reader 40. The stream reader 40 does not alter the streaming of the audio samples along connection 19, but activates the streaming of a different video sample, corresponding to the requested point of view. In order to minimize the loss of quality when switching between video files, the switching preferably occurs when a key frame of the video samples corresponding to the requested point of view is encountered, as later explained in better detail. As soon as such key frame is encountered, the new point of view is streamed to the client.

Figure 1:
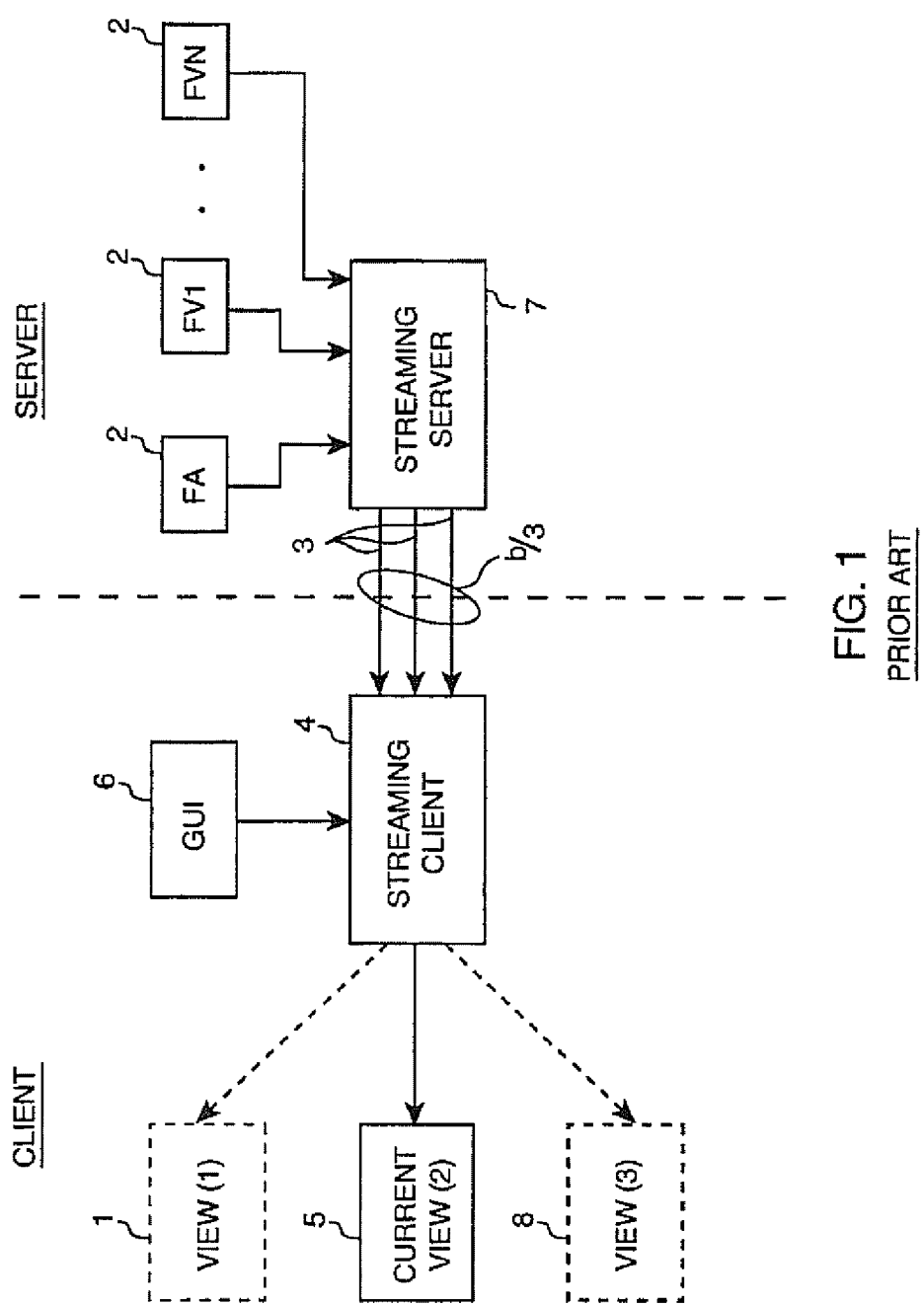
FIG. 1 shows a prior art system, already described above.

Consequently, even when switching between different points of view, the bandwidth of the streaming connection operated by the present invention, i.e. the network connection 18 between the stream producer 34 on the server side and the stream consumer 36 on the client side, is the average bandwidth of a single audio/video stream, and not the cumulative bandwidth of the n audio/video streams, one for each point of view, as in the prior art systems of FIG. 1.

The preferred embodiment of the present invention considers the case in which a single audio file and a plurality of video files, each video file representing a distinct point of view, are provided. However, different embodiments are also possible where a single video file and a plurality of audio files, each audio file representing a different point of listening or a different audio source, are provided. Finally, also an embodiment with plural audio files and plural video files is possible. In the case of a single video file and a plurality of audio files, switching between audio files will occur without altering the streamed video file. In the case of multiple video files and multiple audio files, switching will occur either on video files without altering the streamed audio file, or on audio files without altering the streamed video file. Should also the audio frames be provided with a key-frame technology, the audio switching preferably occurs when an audio key frame is encountered.

The system according to the present invention is a distributed application. A first way of implementing the system according to the invention provides for personal computers on the client side and two server stations on the server side, the first server station comprising the streaming server 11 and the second server station comprising the feed distributor 13. A second way provides for personal computers on the client side and one server station on the server side, the latter comprising both the streaming server 11 and the feed distributor 13. In this, way installation and maintenance of the system are easier and the communication time (latency) between the streaming server and the streaming distributor is reduced. A third way provides for both the client and the server residing on the same machine. A first example of this last embodiment is when the contents are distributed by means of a medium like a CD-ROM, where the use of a single machine is preferred. A second example is when the contents are distributed in a place like an opera theatre, where each spectator is provided with an interactive terminal, used nowadays to allow the spectator to choose the captioning for the performance he is viewing in that moment, as adopted, for example, by the Metropolitan Theatre in New York. In that case, each spectator would be provided with a simple graphic interface (thin client), and the bulk of the system would reside on a single machine, for example a multiprocessor server with a Unix™ operating system. By managing different cameras, the spectator could use the present invention like some sort of "electronic opera glass".

The preferred embodiment of the present invention is described with reference to a single server computer and to a single client operating in a Windows™ environment, where the single client is representative of n different clients which can be connected to the server. The client computer can, for example, be a Pentium III™, 128 MB RAM, with a Windows 98™ operating system. The server computer can, for example, be a Pentium III™, 512 MB RAM, with a Windows 2000 Server™ operating system. Visualization can occur on a computer monitor, a television set connected to a computer, a projection TV or visualization peripherals such as the PC Glasstron™ by Sony.

Data streaming services can adopt a unicasting model or a multicasting model. In the unicasting model, every recipient is sent his own stream of data. A unique session is established between the unique IP address of the server and the unique IP address of the client. In the multicasting model, one single stream of data reaches the various users through routers. There is a single broadcast IP address for the server, which is used as a source of data for the different IP addresses of the various clients. However, in the current implementation over the Internet, routers first ignore and then discard multicast packets. Typically, routers are not configured to forward multicast packets. As a consequence, the present invention preferably embodies a unicasting model. Moreover, the waste of bandwidth of the unicast method, i.e. multiple copies of the same data one for each client, is here an advantage because each client can personalize his or her own show.

Advantageously, in the present invention, a particular user can control the switching between points of view or between listening points for a number of other user. Further, it is also possible for switching commands to be preprogrammed, so that a switching between points of view or listening points occurs automatically, unless differently operated by the user.

The operation of the system according to the present invention will be now described in greater detail.

Switching

As soon as a client application is started, a specific event is requested. This request can, for example, occur through a specific command line argument. From the point of view of the client application, an event is preferably described by the following event parameters: 1) A number n of different points of view of the event; 2) Textual description of each point of view; 3) Logic identifier of each point of view, which is unique and preferably locally defined; 4) Size (width and height) of the main window visualizing the current point of view; 5) Stream bandwidth; 6) Duration of the event; and 7) Default (initial) point of view.

These parameters are used by the client application to build the user interface for the requested event. More specifically, the client application should build: a) the correctly sized window 50 for the stream rendering, in accordance with parameter 4) above; b) the n active (clickable) icons I1 . . . In of the GUI 15, each corresponding to a different point of view, in accordance with parameter 1) above. Each of the icons I1 . . . In will be correctly labeled in accordance with parameter 2) above; and c) a time indicator, which indicates the time elapsed compared to the total time, in accordance with parameter 6) above.

Parameters 3), 5), and 7) will be stored for future use, later described in better detail.

As already explained above, the interface builder 22 is a software object whose task is that of building the above parameters. A C++ language definition of the interface builder 22 ( ) is, for example, the following:

TABLE-US-00001

```
class CInterfaceBuilder {
public:
    ... void BuildInterface(long int eventId);
    ...
};
```

Throughout the present specification, the C++ programming language will be used to describe the functions, procedures and routines according to the present invention. Of course other programming languages could be used, like for example C, Java, Pascal, or Basic.

In order to build the above parameters on the client side, the interface builder 22 will request such parameters to the server, by means of a remote procedure call (RPC). A remote procedure call is sometimes also known as remote function call or remote subroutine call and uses the client/server model. More specifically, a remote procedure call is a protocol used by a program located in a first computer to request a service from a program located in a second computer in a network, without the need to take into account the specific network used. The requesting program is a client and the service-providing program is the server. Like a regular or local procedure call, a remote procedure call is a synchronous operation requiring the requesting program to be suspended until the results of the remote procedure are returned.

In the preferred embodiment of the present invention, the remote procedure call is comprised in the client proxy 21 on the client side. A proxy is an interface-specific object that provides the "parameter marshaling" and the communication required to a client, in order to call an application object running in a different execution environment, such as on a different thread or in another process or computer. The proxy is located on the client side and communicates with a corresponding stub located within the application object being called. The term "parameter marshaling" indicates the process of packaging, sending, and unpackaging interface method parameters across thread or process boundaries.

For a generic description of SOAP (Simple Object Access Protocol) binding of request-response remote procedure call operation over the HTTP protocol, reference can be made to http://msdn.microsoft.com/xml/general/wsdl.asp. A generic SOAP client ("MSSOAP.SoapClient") is provided on http://msdn.microsoft.com/codefsample.asp?urlqmsdn-files/027/001/580/msdncompositedoc.xml. The SOAP client, when used through its high-level API (Application Programming Interface, with reference to RPC-oriented operations) is a fully functional example, in the Windows™ environment, of a client proxy like the client proxy 21 of the present application.

A C++ language definition of the client proxy 21 (CClientProxy) can, for example, be the following:

TABLE-US-00002

```
class CClientProxy {
public:
CClientProxy(std::stringserverConnectionString);
...
void GetEventParameters(long int eventId, std::string& eventParameters);
void EstablishVirtualConnection(long int eventId, long int& sessionId);
void Play (long int sessionId, long int povId, std::string&
connectionString);
void SwitchPOV(long sessionId, long povId);
...
};
``` where serverConnectionString is a string used to bind an instance of CClientProxy to a specific RPC server.

It is assumed that the procedure Interface Builder 22 encapsulates a pointer to an object of the C++ class CClientProxy. The client application creates this object during the initialization thereof and passes this object to the Interface Builder 22 as a constructor parameter, according, for example, to the following class, where the term class is intended in its C++ meaning:

TABLE-US-00003

```
    class CInterfaceBuilder {
    public:
    CInterfaceBuilder(CClientProxy* clientProxy) :
        mClientProxy( clientProxy) { }
    ...
    private: CClientProxy* mClientProxy;
    ...
    };
```

The request by the interface builder 22 of the event parameters to the server using the client proxy 21 is syntactically equivalent to a regular (local) method call:

TABLE-US-00004

```
void CInterfaceBuilder:BuildInterface(long int eventId) {
    std::string        eventParameters;
    mClientProxy->GetEventParameters(eventId, eventParameters);
    ...
};
``` where the method void GetEventParameters (long eventId, std::string & eventParameters); is a remote method exposed by the server.

The remote procedure call details are encapsulated in the server stub 30 on the server side. A server stub is an interface-specific object that provides the "parameter marshaling" and communication required for an application object to receive calls from a client running in a different execution environment, such as on a different thread or in another process or computer. The stub is located with the application object and communicates with a corresponding proxy located within the client effecting the call. For a description of a server stub, reference is made again to http://msdn.microsoft.com/code/sample.asp?url=/msdn-files/027/001/580/msd-ncompositedoc.xml, where a SOAP server (listener) is provided, which wraps COM (Component Object Model) objects exposing their methods to remote callers, such as MSSOAP.SoapClient. The object described in the cited reference is an example, in the Windows™ environment, of the server stub 30.

The Theatre Descriptor 28 is a software object activated by the remote method call GetEventParameters of the interface builder 22, above described.

TABLE-US-00005

```
class CTheatreDescriptor {
public:
void GetEventParameters(long int eventId, std::string& eventParameters);
void GetServerEventParameters(long int eventId, std::string&
audioFilepath,
std::vector<std::string>& videoFilepaths, std::vector<long>& povIds);
};
```

The Theatre Descriptor 28 reads event information from a RDBMS (Relational Database Management System), using the primary key eventId, and returns the event parameters to the interface builder 22. An XML string expressing the operation of the Theatre Descriptor 28 is for example the following:

TABLE-US-00006

```
<EVENT_PARAMETERS>
    <POINTS_OF_VIEW_NUMBER>3
    </POINTS_OF_VIEW_NUMBER>
    <DEFAULT_POINT_OF_VIEW_ID>1
    </DEFAULT_POINT_OF_VIEW_ID>
    <POINTS_OF_VIEW>
        <POINT_OF_VIEW>
            <DESCRIPTION>Front</DESCRIPTION>
            <LOGIC_ID>1</LOGIC_ID>
        </POINT_OF_VIEW>
        <POINT_OF_VIEW>
            <DESCRIPTION>Left</DESCRIPTION>
            <LOGIC_ID>2</LOGIC_ID>
        </POINT_OF_VIEW>
        <POINT_OF_VIEW>
            <DESCRIPTION>Right</DESCRIPTION>
            <LOGIC_ID>3</LOGIC_ID>
        </POINT_OF_VIEW>
    </POINTS_OF_VIEW>
    <MAIN_WINDOW>
        <WIDTH>320</WIDTH>
        <HEIGHT>240</HEIGHT>
    </MAIN_WINDOW>
    <BANDWIDTH_KBPS>300</BANDWIDTH_KBPS>
    <DURATION_SEC>3600</DURATION_SEC>
</EVENT_PARAMETERS>
```

As soon as the remote procedure call is returned to the interface builder 22, the interface builder 22 parses the XML string and stores the event parameters. XML parsing techniques are known per se. A known software product adopting such techniques is, for example, Microsoft XML Parser™.

The Interface Renderer 24

The interface builder 22 instructs the interface renderer 24 to render the specific user interface by means of a local method call, for example:

TABLE-US-00007

```
class CInterfaceRenderer {
public:
CInterfaceRenderer( ) { }
void RenderInterface(std::string& GUIInterfaceDescription);
...
};
...
void CInterfaceBuilder::BuildInterface(long int eventId) {
...
CInterfaceRenderer* mInterfaceRenderer;
}
...
void CInterfaceBuilder::BuildInterface(long int eventId) {
    ...
        long int    initialPointOfView;
    ...
    // store events parameters
```

TABLE-US-00007-continued

```
    ...
    // generates abstract graphical user interface definition string
    (an XML string)
    std::string    GUIInterfaceDescription;
    ...
    mInterfaceRenderer = new CInterfaceRenderer;
    mInterfaceRenderer->RenderInterface(GUIInterfaceDescription);
    ...
}
```

The string GUIInterfaceDescription of the above local method call is an abstract definition of the GUI. A definition in XML language of the GUI is for example the following:

TABLE-US-00008

```
<GUI_INTERFACE>
    <VIDEO_WINDOW>
        <X>10</X>
        <Y>10</Y>
        <WIDTH>320</WIDTH>
        <HEIGHT>240</HEIGHT>
    </VIDEO_WINDOW>
    <ICON_WINDOW>
        <X>100</X>
        <Y>10</Y>
        <CAPTION>Front</CAPTION>
        <POINT_OF_VIEW_ID>1</POINT_OF_VIEW_ID>
    </ICON_WINDOW>
    <ICON_WINDOW>
        <X>150</X>
        <Y>10</Y>
        <CAPTION>Left</ CAPTION>
        <POINT_OF_VIEW_ID>2</POINT_OF_VIEW_ID>
    </ICON_WINDOW>
    <ICON_WINDOW>
        <X>200</X>
        <Y>10</Y>
        <CAPTION>Right</CAPTION>
        <POINT_OF_VIEW_ID>3</POINT_OF_VIEW_ID>
    </ICON_WINDOW>
    <TIME_INDICATOR> <X>300</X>
    <Y>10</Y>
    <FONT_FACE>Times</FONT_FACE>
    <FONT_SIZE>12</FONT_SIZE>
    <FONT_STYLE>Bold</FONT_STYLE>
    <TOTAL_DURATION_SEC>3600
    </TOTAL_DURATION_SEC>
    </TIME_INDICATOR>
</GUI_INTERFACE>
```

The interface renderer 24 uses the services provided by the operating system, the windowing interface or the container application to render the correct user interface.

Detailed Description of the Streaming Operation

As already explained above, the interface builder 22, on return of the local method call BuildInterface, requests start of streaming. The initial point of view is the default point of view above defined. Usually, RPC-oriented SOAP over HTTP connections are not persistent. As a consequence, the interface builder 22 must first establish a virtual persistent session with the server. This can be done by means of the following remote method call:

TABLE-US-00009

```
long int    gSessionId;
...
void CInterfaceBuilder:BuildInterface(long int eventId) {
    ...
    mClientProxy->EstablishVirtualSession(eventId, gSessionId);
    ...
}
```

The method
void EstablishVirtualSession(long int eventId, long int & sessionId); sessionId);
is a remote method exposed by the server. Such method activates the server session manager 26. More particularly, the server session manager 26 is a software object which generates a globally unique session identifier and stores this session identifier in an associative map for quick retrieval. The session identifier represents the key of the associative map. The value of the associative map is an object of the class CSessionData, partially defined, for example, as follows:

TABLE-US-00010

```
class CSessionData {
public:
CSessionData(long int eventId) :
        mEventId(eventId) { }
...
long int GetEventId( ) {return mEventId;}
...
private:
long int       mEventId;
...
};
...
class CServerSessionManager {
public:
...
void EstablishVirtualSession(long int eventId, long int& sessionId);
void Play(long int sessionId, long int povId, std::string&
connectionString);
void SwitchPOV(long int sessionId, long int povId);
...
private:
CTheatreDescriptor*           mTheatreDescriptor;
std::map<long int, CSessionData*>            mSessions;
...
};
...
void CServerSessionManager::EstablishVirtualSession(long int eventId,
long int& sessionId) {
        //generate globally unique identifier and store in sessionId
        CSessionData* session = new CSessionData(eventId);
        mSessions [sessionId] = session;
}
```

It can be assumed, without loss of generality, that mTheatreDescriptor is a pointer to an instance of the Theatre Descriptor 28. On the client side, gSessionId is a global variable which is accessible from all application objects.

The interface builder 22 can perform streaming by means, for example, of the following remote procedure call:

TABLE-US-00011

```
void CInterfaceBuilder::BuildInterface(long int eventId) {
        ...
        std::string          connectionString;
        ...
        mClientProxy->Play(gSessionId, initialPointOfView,
        connectionString);
        ...
}
``` where
void Play (long int sessionId, long int povId, std::string & connectionString);
is a remote method exposed by the server which activates the server session manager 26. The session data are encapsulated in a CSessionData object, and are retrieved from the session identifier sessionID through the following exemplary use of the associative map of the session identifier:

TABLE-US-00012

```
void CServerSessionManager::Play(long int sessionId, long int povId,
std::string& connectionString)
        { CSessionData*         callerSessionData = mSessions
                                [sessionId];
        long int                eventId =
                                callerSessionData->GetEventId( );
        long int                defaultPovId;
        std::vector<long>       povIds;
        std::string             audioFilepath;
        std::vector<std::string> videoFilepaths;
        mTheatreDescriptor-
                                >GelServerEventParameters(eventId,
                                audioFilepath,
        videoFilepaths, povIds);
        ...
}
``` where the method is a method of the theatre descriptor 28 (CTheatreDescriptor) not exposed to remote callers.

TABLE-US-00013

```
void GetServerEventParameters (long eventId, std::string& audioFilepath,
std::vector<std::string>& videoFilepaths, std::vector<long>& povIds);
```

On return, the server session manager 26 knows the path of the file containing the audio samples and the path of each file containing the video samples. In the preferred embodiment of the present invention, each video file refers to a different point of view. The video file paths are stored in the STL (Standard Template Library) vector videoFilepaths. The logic identifiers of the points of view, which are the same as those returned from the theatre descriptor 28 to the client by GetEventParameters, are stored in the above defined STL vector povIds. A standard template library (STL) is a C++ library which uses templates to provide users with an easy access to powerful generic routines. The STL is now part of the C++ standard.

At this point, the server session manager 26 creates an instance of the above described software object stream reader 40 and instructs the stream reader 40 to read the files returned from GetServerEventParameters. A partial C++ definition of the class CStreamReader is, for example, the following:

TABLE US-00014

```
class CStreamReader {
public:
CStreamReader( std::string& audioFilepath, std::vector<std::string>&
videoFilepaths, std::vector<long>& povIds, long initialPovId);
...
};
```

The following is a continuation of the implementation of the "Play" method of the server session manager 26:

TABLE US-00015

```
void CServerSessionManager::Play(long int sessionId, long int povId,
std::string& connectionString) {
        ... CStreamReader*     streamReader = new
CStreamReader(audioFilepath, videoFilepaths, povIds, povId);
        callerSessionData->SetStreamReader(streamReader);
        ...
}
```

CSessionData will encapsulate the stream reader 40 of its session according to the following definitions:

TABLE US-00016

```
class CSessionData {
public:
...
void SetStreamReader(CStreamReader* streamReader) {mStreamReader =
streamReader;}
CStreamReader* GetStreamReader( ) {return mStreamReader;}
...
private:
CStreamReader*          mStreamReader;
...
};
```

Logic Structure of Audio/Video Files and Streaming Prerequisites

A typical audio/video file intended for streaming comprises a continuous succession of samples. Each sample is either a video sample or an audio sample. Generally speaking, both audio and video samples are compressed. Each sample is univocally defined by sample attributes, like for example: 1) Sample stream id 2) Sample time 3) Sample duration 4) Sample size 5) Whether the sample is a key frame or not Each sample contains compressed raw sample data. A sample stream id identifies the sample stream. For example, a sample stream id equal to 1 can identify a video stream, and a sample stream id equal to 2 can identify an audio stream.

In each stream samples are stored by time order. Moreover, in the audio/video file, video samples are interleaved with audio samples. The actual interleaving sequence is determined at the time of compression, according to explicit choices which relate to performance and optimal rendering considerations. A one-to-one interleaving (audio-video-audio-video) will be assumed throughout the present application. The person skilled in the art will, of course, recognize also different interleaving sequences suitable for the purposes of the present application. According to the preferred one-to-one interleaving sequence, the content an audio/video file can be represented as follows: [1] Video Sample 1 [2] Audio Sample 1 [3] Video Sample 2 [4] Audio Sample 2 [5] Video Sample 3 [6] Audio Sample 3 . . . [2x−1] Video sample x [2x] Audio sample x . . . .

The timestamp of each sample depends on video parameters, mainly on the number of frames per second (fps) of the video stream. If a video stream contains 25 frames per second, each video sample has a timestamp that is a multiple of 40 ms. Audio samples are timed in a corresponding manner, in order to obtain interleaving. With reference to the above example, the following is obtained: [1] Video Sample 1→0 ms [2] Audio Sample 1→0 ms [3] Video Sample 2→40 ms [4] Audio Sample 2→40 ms [5] Video Sample 3→80 ms [6] Audio Sample 3→80 ms and so on.

A C++ representation of a generic sample can for example be the following:

TABLE US-00017

```
struct generic_sample {
        long int        sampleStreamId;
        long int        sampleTime;
        long int        sampleDuration;
        long int        sampleSize;
        bool            isKeyFrame;
        void*           sampleRawData;
};
```

A generic stream can be represented as a STD vector of samples:

TABLE US-00018

```
std::vector<generic_sample>  videoStream;
std::vector<generic_sample>  audioStream;
```

Once a stable network connection has been established, a streaming session on the server side comprises the following steps: 1) Sending of global parameters to the client, such as: a) duration of the media; b) number of streams (two, in the preferred embodiment of the present invention); c) stream id and type for each stream (for example 1 for the video stream and 2 for the audio stream); d) attributes of the video stream: for example, width, height, fps and codec; and e) attributes of the audio stream: for example, sampling parameters (e.g. 22 KHz/16 bit/stereo) and codec. 2) Iteration through each element of the sample vector and send sample attributes and sample raw data to the client.

As soon as the last iteration is terminated, the connection is closed.

Streaming of Audio/Video Samples from Server to Client

At the application layer, data are sent by the server and received by the client in accordance with one of a plurality of known application-level protocols. For example, data are sent in a binary mode for optimum performance. Alternatively, data are packaged to compensate for different byte-ordering on the client side.

At the transport layer, data can be sent using reliable (with error checking) or unreliable (without error checking) protocols. For example, TCP (Transfer Control Protocol) is a reliable protocol, while UDP (User Datagram Protocol) is an unreliable protocol. Most streaming servers allow the client to choose between unreliable (and intrinsically faster, due to less overhead) and reliable transport protocols. In the case of unreliable protocols, the loss of stream samples due to the absence of an error checking feature is compensated by the client with various algorithms related to the optimal rendering of streams on the client side. Such algorithms are known to the person skilled in the art and will not be described here in detail. In the following, the TCP (transfer control protocol) will be used, without loss of generality. For a more detailed discussion of the TCP protocol, reference is made to "TCP/IP Illustrated, Volume 1", W. Richard Stevens—The Protocols—Addison-Wesley Publishing Company—10th Printing—July, 1997, in particular with reference to the following fields: Network Layering, TCP, UDP, TCP connection establishment and termination, TCP interactive data flow, TCP bulk data flow, and TCP timeout and retransmission.

With reference to the exact timing of the transmission of the samples, the main goal of the streaming technology is that of having the sample on the client side when needed. With reference to a generic video sample N and relative to the sampleTime of the first video sample, which can be set to zero without loss of generality, this can be expressed in C++ with the instruction.

VideoStream[N]. sampleTime

Two additional factors have to be considered: 1) The server cannot push samples at the maximum available rate. Otherwise, the server could overrun the client, even during the buffering stage; and 2) The client should buffer in advance (pre-buffer) a proper number of samples. Otherwise, sudden drops of the instantaneous network bandwidth could cause delays in the availability of the samples. With the term delay, the fact that the sampleTime of a currently available sample could be less than the elapsed rendering time is meant.

A combined client/server data sending algorithm suitable for the purposes of the present invention comprises the following steps:

Step 1→ Deliver a first amount of samples, corresponding to the number of samples requested for pre-buffering, at the maximum available rate; Step 2→ Deliver the remaining samples at a rate which (on average) keeps the client buffer full.

The second step can be performed by means of a variety of methods. For example, the client could delay acknowledgement of the samples to prevent buffer overrun, or could explicitly request the next sample or samples. The request is part of the application-level protocol. In the preferred embodiment of the present invention, it will be assumed that the client delays the acknowledgement of the samples "as needed". More specifically, no delay is present during the pre-buffering step, and adaptive delay is used during the second step, to prevent overrun of the subsequent samples while maintaining the buffer full, on average. With this assumption, a C++ implementation of the second step can be as follows:

TABLE US-00019

```
long       IAudio = 0;
while (!Video < videoStream.size( )) {
    SendToClient(videoStream[IVideo++ ]);
    SendToClient(audioStream[IAudio++ ]);
}
``` where the method
void SendToClient(generic_sample curSample);
is a procedure which sends a sample from the server to the client according to an application-level protocol using TCP as the transport layer protocol, wherein the client governs the timing of the procedure calls by means of delayed acknowledges.

The Stream Reader 40

A more detailed C++ definition of the stream reader 40 is the following:

TABLE US00020

```
class CStreamReader {
...
public:
void       SetRequestedPov(long povId) {mRequestedPov = povId;}
long       GetSamplesNumber( ) {return mAudioStream.size( );}
generic_sample         GetCurrentSample( );
...
private:
bool       mLastSampleIsVideo;
long       mRequestedPov;
long       mCurrentPov;
long       mCurSample;
std::map<long, std::vector<generic_sample> >   mVideoStreams;
std::vector<generic_sample>                    mAudioStream;
...
};
```

More specifically, it is assumed that the stream reader 40 (CStreamReader) preloads audio samples in a STL vector (mAudioStream), and preloads video samples from each point of view in STL vectors. These vectors (in a number of n, one for each point of view) are stored as values in a STL map (mVideoStreams) whose keys are the logic identifier of the points of view. The current point of view is stored in the data member mCurrentPov. The current sample is stored in the data member mCurSample. The initial value of mCurSample is 0. The details of preloading the samples from the files will not be described in detail in the present application because methods to fill memory structures from input file streams (the term stream being used here in the STL meaning) are well known to the person skilled in the art.

The current audio/video samples are obtained from the files FA and FV1 . . . FVN 12 (see FIG. 3) by means of the method GetCurrentSample. An implementation of the method GetCurrentSample of CStreamReader is the following:

TABLE US-00021

```
generic_sample CStreamReader::GetCurrentSample( ) {
    generic_sample    currentSample;
    if (mLastSampleIsVideo) {
        //outputs audio
        //accesses current sample
        currentSample = mAudioStream[mCurSample];
        mLastSampleIsVideo = false;
    }
    else {
        //outputs video.
        //selects correct stream in map using requested point of view as
        //the key then accesses current sample
        currentSample = (mVideoStreams[ mRequestedPov ])
        [mCurSample];
        mLastSampleIsVideo = true;
    }
    mCurSample++;
    return currentSample;
}
```

It is assumed that in the CStreamReader constructor the data member mLastSampleIsVideo has been initially set to false, so that the first output sample of the interleaved sequence is a video sample. The mRequestedPov initialization will be described later.

Switching (Server Side)

The stream reader 40 (CStreamReader) comprises an access method SetRequestedPov which allows switching of the point of view. In particular, once the value of the variable mRequestedPov of CStreamReader has been modified by means of the access method SetRequestedPov, the method GetCurrentSample of CStreamReader begins (on the following calls) to output video samples of the new point of view to the streaming server 11. It has to be noted that the output of audio samples is unaffected by this method. As a consequence, the switching of point of view has no audible effect.

With reference to the quality of the video after switching, the following should be considered. A video frame is usually both statically and dynamically compressed. Static compression is obtained by use of methods deriving from static image compression. With dynamic compression, a differential compression of each sample with reference to the previous sample is intended. As a consequence, a random switch would degrade rendering on the client side. This is because the reconstruction of the full sample (known as differential decoding) would fail, due to the unavailability of a correct uncompressed base (i.e. previous) sample, because the actual previous sample belongs to a different stream. However, it is common that a video stream also comprises frames which are not differentially compressed. Such frames are known as "static frames" or "key frames". Usually, key frames are generated to avoid unacceptable degradation in video quality. Key frame generation follows both deterministic rules (for example, by generating a key frame every n frames, like 1 key frame every 8 frames) and adaptive rules (for example, by generating a key frame each time the encoder detects a sudden change in the video content). Deterministic rules avoid drifts in video quality caused by accumulation of small losses of video details through successive differential compressions. Adaptive rules avoid instantaneous degradation of video quality caused by intrinsic limits of differential encoding in presence of sudden changes in video content from one frame to the following. Key frame generation techniques, which depend on the encoder and the video source, are well known to the person skilled in the art. A detailed description of such techniques is omitted, because known as such.

In the preferred embodiment, the present invention allows a smooth video switching without degradation of video quality by preferably ensuring that a switch takes place when a key frame of a video frame sample is generated. In this way, no loss of video quality occurs on the client side, since the client does not need the correct base (i.e. previous) sample to render the sample. Although waiting for a key frame would cause a switch which, technically speaking, is not instantaneous, the maximum delay, in case for example of video frames having 1 key frame every 8 frames, would be that of about 0.3 seconds. In order to perform switching by means of the procedure stream reader 40, the following is a preferred implementation of the above described method GetCurrentSample( ):

TABLE US-00022

```
generic_sample CStreamReader::GetCurrentSample( ) {
    generic_sample    currentSample;
    if (mLastSampleIsVideo) {
        //outputs audio
        //accesses current sample
        currentSample = mAudioStream[mCurSample];
        mLastSampleIsVideo = false;
    }
    else {
        //outputs video.
        If (mRequestedPov == mCurrentPov) {
            // no switch requested
            // selects correct stream in map using current point of view
            // as the key then accesses current sample
            currentSample = (mVideoStreams[mCurrentPov])
            [mCurSample];
        } else
        {
            // a switch was requested
            generic_sample    newStreamSample;
            // get current sample from new (requested) stream
            newStreamSample = (mVideoStreams[ mRequestedPov ])
            [mCurSample];
            if (newStreamSample.isKeyFrame) {
                // current sample in new (requested) stream is a key frame
                // so streams can be seamlessly switched
                mCurrentPov = mRequestedPov;
                //output key frame sample from new (requested) stream
                currentSample = newStreamSample;
            }
            else {
            //continue output of previous stream
                currentSample = mVideoStreams[ mCurrentPov ])
                [mCurSample];
            }
        }
        mLastSampleIsVideo = true;
    }
    mCurSample++;
    return currentSample;
}
```

It is here assumed that, when constructing CStreamReader, both the mRequestedPov and the mCurrentPov data members are set to the value of the identifier of the initial point of view, which is the parameter initialPovId of the CStreamReader constructor.

In conclusion, the GUI manager 14 instructs the feed distributor 13 to switch between a first video file and a second video file when a key frame of the second video file is encountered. In the case where the audio files are differentially compressed before streaming and comprise key frames, the GUI manager 14 can similarly instruct the feed distributor (13) to switch between a first audio file and a second audio file when a key frame of the second audio file is encountered.

Detailed Description of the Method Play of the Server Session Manager 26

The stream producer 34 is responsible for performing a streaming session on the server side. More specifically, after having initialized a new instance of the stream reader 40 and having stored the pointer to the stream reader 40 in CSessionData for later retrieval, the server session manager 26 creates a new instance of the software object stream producer 34, according to the following exemplary code:

TABLE US-00023

```
class CStreamProducer{
public:
CStreamProducer(CStreamReader* streamReader) :
    mStreamReader(streamReader) { }
std::string&         BeginStreamingSession( );
...
private:
CStreamReader*    mStreamReader;
static void ThreadStreamingSession(void* pParm);
...
};
...
void CServerSessionManager::Play(long int sessionId, long int povId,
std::string& connectionString) {
    ...
    CStreamProducer* streamProducer = new
    CStreamProducer(streamReader);
    callerSessionData->SetStreamProducer( streamProducer);
    connectionString = streamProducer->BeginStreamingSession( );
}
```

CSessionData encapsulates the stream producer 34 in the following way:

TABLE US-00024

```
class CSessionData {
public:
...
void SetStreamProducer(CStreamProducer* streamProducer)
{mStreamProducer =
streamProducer;}
...
private:
CStreamProducer*       mStreamProducer;
...
};
```

The method BeginStreamingSession of CStreamProducer returns control to the caller immediately after having created a new thread associated with the execution of the static method ThreadStreamingSession, which controls the streaming session. Execution of threads per se is well known in the prior art and will not be discussed in detail. The variable connectionString (which will be passed by reference when returning to the client) contains the specific connection string the client must use to connect to the stream producer 34. For a TCP/IP connection, a connection stream is in the form protocol://server-ip-address-or-name:port-number.

Although the definition of the method CStreamProducer is operating system specific and will be here described with reference to the Windows™ environment, the person skilled in the art will easily recognize those minor changes that will allow the method to be executed in different environments.

As already explained above, in a streaming session the stream producer 34 first establishes a persistent connection with the client, then sends stream global parameters to the client, and finally sends samples to the client. The loop for sending samples becomes the following:

TABLE US-00025

```
void CStreamProducer::ThreadStreamingSession(void* pParm) {
// listen for client connection request
...
// establish connection
...
// send stream global parameters
...
// send all samples
// We assume that "this" pointer was cast to a void pointer
// and passed as pParm during thread creation.
// For example in a Windows environment
//_beginthread(ThreadStreamingSession, NULL, static_cast<void*>
( this));
    CStreamProducer*    thisPtr = static_cast<CStreamProducer*>
    (pParm);
    for (long I = 0; I < thisPtr->mStreamReader->GetSamplesNumber( );
    I++) {
        SendToClient(thisPtr->mStreamReader->GetCurrentSample( ));
    }
}
```

As shown in the loop, the point of view whose samples are sent to the client is determined by the value of the logic point of view identifier stored in the data member mCurrentPov of the stream reader 40 (CStreamReader).

Routines that can be called from multiple programming threads without unwanted interaction between the threads are known as thread-safe. By using thread-safe routines, the risk that one thread will interfere and modify data elements of another thread is eliminated by circumventing potential data race situations with coordinated access to shared data. It is possible to ensure that a routine is thread-safe by making sure that concurrent threads use synchronized algorithms that cooperate with each other.

According to the present invention, an object of the class CStreamReader should be thread-safe (this is, for example, mandatory when using C++), since the critical variable (data member) of the class, mCurrentPov, is indirectly accessed by two different threads, namely by methods of CServerSessionManager and by CStreamProducer::ThreadStreamingSession, which is executed in another thread. Access to the critical variable mCurrentPov of CStreamReader must be synchronized using synchronization objects. Thread-safe access to critical data through synchronization is well known as such to the person skilled in the art and will not be here discussed in detail.

Receiving Audio/Video Samples on the Client Side

On the client side, on return of the remote method call mClientProxy.Play of the interface builder 22, the interface builder 22 creates the software objects "stream consumer" 36 and "stream renderer" 37.

The stream consumer 36 receives the samples from the stream producer 34, while the stream renderer 37 renders the received samples.

The stream rendering operation is operating system dependent. The stream renderer 37 operates by decompressing video samples and displaying video samples (with proper timing according to the timestamps of the video samples) as static raster images using the main video window created by the interface builder 22. This video window is accessible to the stream renderer 37 by means, for example, of a global pointer to the main video window initialized by the interface builder 22. The stream renderer 37 must be able to decompress audio samples and play them (with proper timing according to timestamps of audio samples) as audio chunks, using services from the operating system, or from the multimedia API of the stream renderer itself.

The stream consumer 36: 1) implements the client side portion of the streaming session; 2) is connected to the stream producer 34 by means of the connection string defined above; 3) receives the global stream parameters; 4) pre-buffers the content as needed; and 5) enters a loop to receive all samples from the stream producer 34, delaying acknowledges of the samples to maintain the buffer full on average, as already explained above.

A C++ expression of the stream consumer 36 and of the stream renderer 37 can be as follows:

TABLE US-00026

```
class CStreamRenderer {
public:
...
void RenderSample(generic_sample curSample);
// implementation is operating system specific
...
};
...
class CStreamConsumer {
public:
CStreamConsumer (CStreamRenderer* streamRenderer, std::string&
serverConnectionString) :
       mStreamRenderer( streamRenderer),
       mServerConnectionString(serverConnectionString) { }
void    BeginStreamingSession( );
...
private:
CStreamRenderer*    mStreamRenderer;
std::string         mServerConnectionString;
static void ThreadStreamingSession(void* pParm);
...
};
...
class CInterfaceBuilder {
...
private:
CStreamConsumer* mStreamConsumer;
CStreamRenderer* mStreamRenderer; ... };
...
void CInterfaceBuilder::BuildInterface(long int eventId) {
   ...
   mStreamRenderer = new CStreamRenderer;
   mStreamConsumer = new CStreamConsumer(mStreamRenderer,
   connectionString);
   mStreamConsumer->BeginStreamingSession( );
}
```

The method BeginStreamingSession of the stream consumer 36 (CStreamConsumer) returns control to the caller immediately after creating a new thread associated with the execution of the static method ThreadStreamingSession, which takes care of the streaming session. For example:

TABLE US-00027

```
void CStreamConsumer::ThreadStreamingSession(void* pParm) {
// request connection to server
...
// establish connection
...
// get streams global parameters
...
```

TABLE US-00027-continued

```
//get all samples
// We assume that "this" pointer was cast to a void pointer
// and passed as pParm during thread creation.
// For example in a Windows environment
//_beginthread(ThreadStreamingSession, NULL, static_cast<void*>
(this));
      CStreamConsumer*  thisPtr = static_cast<CStreamConsumer*>
                                  (pParm);
      generic_sample    curSample;
      while (ReceiveFromServer( curSample)) {
         thisPtr->mStreamRenderer->RenderSample( curSample);
      }
}
```

The Function
bool ReceiveFromServer(generic_sample & curSample);
is a function which receives a sample from the server according to an application-level protocol which uses TCP as the transport layer protocol. The client governs the timing of the procedure calls by means of delayed acknowledges. The server indicates that no more samples are available using the boolean return value of the function.

Although the definition of the method CStreamConsumer::ThreadStreamingSession is operating system specific and will be here described with reference to the Windows™ environment, the person skilled in the art will easily recognize those minor changes that will allow the method to be executed in different environments.

The stream consumer 36 implements pre-buffering using well-known standard prebuffering techniques, which will not be described in detail.

As soon as the client side application has ended initialization, the main event loop is entered, which depends on the operating system. The stream consumer 36 receives samples from the stream producer 34 on a different execution thread. After each sample is received, the stream consumer 36 calls the method RenderSample of the stream renderer 37 (CStreamRenderer), which renders the sample.

Switching (Client Side)

The user can request a switch of current point of view by interacting, for example, with the click of a mouse button, with the active icons I1 . . . In representing the alternative points of view. As soon as the user requests a switch of current point of view, an operating system (or windowing manager) event is triggered. Details on the handling of mouse events are operating system dependent. Without loss of generality, it will be assumed that the appropriate event handler calls the method SwitchPOV of the user event manager 23. The call is effected after decoding the requested point of view logic id from the event parameters (the coordinates of the mouse click, from which a unique icon can be determined) or from the context. In the latter case, the called event handler could be a method of the window class encapsulating the icon, the term class being here used in the C++ meaning. For example:

TABLE US-00028

```
class CUserEventManager {
public:
CUserEventManager(CClientProxy* clientProxy) :
mClientProxy(clientProxy) { }
void SwitchPOV(long povId);
...
private:
CClientProxy* mClientProxy;
...
};
```

TABLE US-00028-continued

```
    ...
    void CUserEventManager::SwitchPOV(long povId) {
    mClientProxy.SwitchPOV(gSessionId, povId);
    }
```

The Function
void SwitchPOV(long sessionId, long povId);
is a remote method exposed by the server, which activates the server session manager 26, by identifying the client through the session id of the client. The session id of the client is stored on the client side in the global variable gSessionId above described.

The server session manager 26 (CServerSessionManager) retrieves the session data (encapsulated in a CSessionData object) from the session identifier sessionId, through the following exemplary use of the associative map:

TABLE US-00029

```
void CServerSessionManager::SwitchPOV (long int sessionId, long int povId) {
    CSessionData*    callerSessionData = mSessions[sessionId];
    CStream.Reader*  streamReader = callerSessionData->GetStreamReader( );
    streamReader->SetRequestedPov(povId) ;
}
```

As shown above, setting data member mRequestedPov of the Stream Reader 40 (CStreamReader) associated to session sessionId using its access member SetRequestedPov causes a switch of the video stream returned by the stream reader 40 (through its method GetCurrentSample) to the stream producer 34, and consequently sent from the stream producer 34 to the stream consumer 36 on the client side. The switch occurs in method GetCurrentSample of Stream Reader 40 (CStreamReader) preferably when a key frame in the video stream containing the requested point of view is encountered.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

The invention claimed is:

1. A method for switching between audio-video streams transmitted to a plurality of users over the internet, comprising:
   establishing at least one separate connection with each of said plurality of users over the internet;
   streaming a first audio-video stream relating to a first point of view of an event to at least one of said plurality of users via at least one of said connections; and,
   for at least one of said plurality of users, switching the video in from said first stream to a video in a second audio-video stream relating to a second point of view of said event, wherein:
   (a) only one of said first and second streams is streamed to a user at a time;
   (b) the first and second streams comprise differentially compressed data; and,
   (c) the video in the first stream switches to the video in the second stream at a key frame in the video of the second stream.

2. The method of claim 1, wherein the switch does not cause any interruptions to the audio or video.

3. The method of claim 2, wherein said switch occurs in a pre-programmed way.

4. The method of claim 2, wherein said switch occurs upon a command.

5. The method of claim 4, wherein said command is from a user.

* * * * *

UNITED STATES PATENT AND TRADEMARK OFFICE
CERTIFICATE OF CORRECTION

PATENT NO. : 10,305,948 B2
APPLICATION NO. : 14/993334
DATED : May 28, 2019
INVENTOR(S) : Flippo Costanzo, Saverio Roncolini and Antonio Rossi It is certified that error appears in the above-identified patent and that said Letters Patent is hereby corrected as shown below:

In the Claims

Claim 1, Line 19, (approx.) should read:
video in said first stream to a video in a second Signed and Sealed this
Ninth Day of July, 2019

Andrei Iancu
*Director of the United States Patent and Trademark Office*